United States Patent Office 3,681,258
Patented Aug. 1, 1972

3,681,258
ACTIVATION OF AN OXIDATIVE DEHYDROGENATION CATALYST
Emory W. Pitzer, Bartlesville, Okla., assignor to Phillips Petroleum Company
No Drawing. Filed Nov. 24, 1969, Ser. No. 879,636
Int. Cl. B01j *11/82*
U.S. Cl. 252—437                                                  3 Claims

ABSTRACT OF THE DISCLOSURE

Oxidative dehydrogenation catalysts consisting essentially of phosphorus, tin, a metal selected from the group consisting of Group Ia metals and Group IIa metals, and oxygen, wherein the phosphorus is present in the range of 0.1 to 16 weight percent, the tin is present in the range of 15 to 75 weight percent, the Group Ia or Group IIa metal is present in the range of 0.1 to 10 weight percent and the oxygen is present in sufficient quantity to produce the remaining total catalyst composition, are activated by contacting the formed particles of catalyst with water.

---

This invention relates to a process for the activation of a catalyst.

Oxidative dehydrogenation catalysts are known in the art. For example, see U.S. Pat. 3,274,283 issued to Bethell on Sept. 20, 1966, and copending U.S. application Ser. No. 810,831 filed on Mar. 26, 1969, now abandoned.

It has now been found that improved oxidative dehydrogenative catalysts can be formed by washing the final catalysts with water.

The improved catalysts are useful for the oxidative dehydrogenation of compounds such as alkenes, alkadienes, cycloalkenes, alkylpyridines and alkyl aromatics.

Accordingly, it is an object of this invention to provide a process for the activation of an oxidative dehydrogenation catalyst.

Other aspects, objects and advantages will become apparent to one skilled in the art upon consideration of the disclosure.

This invention is a process for the activation of a final oxidative dehydrogenation catalyst comprising washing the catalyst with water. The temperature of the water ranges from 35 to 212° F. and the time for washing ranges from 10 seconds to 60 minutes in one or more steps.

The oxidative dehydrogenation catalysts which are applicable for use in the present invention are the tin, phosphorus, and alkali or alkaline earth metal-containing catalysts disclosed in copending U.S. application Ser. No. 810,831 filed on Mar. 26, 1969, now abandoned. These catalysts contain from about 0.1 to about 16 weight percent phosphorus, from about 15 to about 75 weight percent tin, and from about 0.1 to about 10 weight percent Group I-A or II-A metal, the remainder consisting substantially of oxygen.

Such catalysts are conventionally prepared. In general, they are prepared from any phosphorus, tin, and alkali or alkaline earth metal-containing materials so long as at least one of the materials used contains oxygen, so long as none of the materials is deleterious to catalytic dehydrogenation, and so long as substantially all of the elements in the catalyst preparation materials used, other than phosphorus, tin, oxygen, and the Group I-A or II-A metal, are volatilized by calcination of the catalyst composite at about 1000° F. or washed out of the composition during its wet hydrogel stage or during initial operation in the dehydrogenation process.

The catalyst composition consists essentially of that material formed by admixing (1) at least one phosphorous-containing material; (2) at least one tin-containing material; and (3) at least one material containing a metal selected from the group consisting of Group Ia metals and Group IIa metals wherein at least one of the phosphorus, tin and Group Ia and Group IIa metal contains oxygen.

Particularly useful phosphorus-containing material includes Group Ia metal phosphate, Group IIa metal phosphate, phosphorus pentoxide, phosphoric acid, ammonium phosphate, lithium dihydrogen phosphate, and ammonium dihydrogen phosphate.

Particularly useful tin-containing materials include stannic and stannous halide, sulfate, acetate, oxide, tartrate, and nitrate. Of these the preferred tin-containing materials are stannic chloride, stannic sulfate, stannous sulfate, and stannic oxide.

Particularly useful Group Ia and Group IIa metal-containing materials include the metal nitrates, halides, sulfates, oxylates, acetates, carbonates, propionates, tartrates, phosphates, oxides, and hydrides. Preferred Group Ia and Group IIa materials are lithium chloride, lithium dihydrogen phosphate, magnesium nitrate, barium nitrate, lithium nitrate, calcium hydroxide, lithium, magnesium, barium and calcium.

The preferred catalysts are prepared by coprecipitating suitable phosphorus and tin compounds, aging the wet precipitate, washing the wet precipitate, spray-drying the precipitate, calcining the resulting powder, converting the powder into tablets, calcining the tablets impregnating the tablets with lithium nitrate, and calcining the impregnated tablet to provide the finished catalyst.

If the Group I-A or II-A metal component is not included in the composition, the resulting catalyst has substantial activity for oxidative dehydrogenation but the catalyst is short lived and much less desirable.

After the final catalyst has been prepared according to the above-described procedure. The catalyst is washed with water. This can be accomplished by placing the tablets in a wire mesh container, immersing the container in a water bath, and moving the container up and down to mix the tablets and the water. The water can be replaced in a bath about twice per minute. After washing and draining, the tablets are dried. The temperature of the water ranges from 35 to 212° F. As indicated by the working examples, various water temperatures yield desirable results. The time for washing ranges from 10 seconds to 60 minutes in one or more steps. Preferably washing times range from 1 minute to 10 minutes.

The treatment of the present invention is applied to the catalyst after the particle forming stage of the catalyst preparation sequence. Thus, when catalysts of tin, phosphorus and another metal such as lithium have been formed into particles such as tablets, pellets, extrudates, granules, and the like, they can be treated either before or after any final calcination treatment. A final calcination treatment is generally necessary when a conventional lubricant has been added to the catalyst powder to facilitate the tableting or other particle forming operation. The calcination removes substantially the lubricant.

When one of the components of the catalyst, such as an alkali meal component, is added after the catalyst particle has been formed, such as by impregnation of a tablet with a solution of the component, the invention treatment can be applied to the catalyst in any one of three ways: either before the calcination which follows the particle forming, after the calcination which follows the particle forming, or after the calcination which follows the impregnation. Calcination after any impregnation step frequently is necessary to convert the impregnant into a catalytically active form. Thus, the invention treatment can be applied to the catalyst at several points in the catalyst preparation sequence, but in every case it is after the catalyst particle is in its final form or shape. Washing after the incorporation of the alkali or alkaline earth metal is presently preferred.

The invention treatment consists of washing the suitably formed catalyst particles with water at a temperature within the range of 35 to 212° F. for a period ranging from 10 seconds to 60 minutes, preferably 1 minute to 10 minutes. The washing can be done using any convenient apparatus and technique. The washing is preferably carried out with some agitation by movement of the catalyst particles, or movement of the wash water through the particles, or both. For example, a wire mesh tray of catalyst tablets can be immersed in a water bath and moved up and down while the bath water is replaced about twice per minute.

As will be shown later, the washing treatment produces substantially improved results. The theoretical reason for the improvement is not known with certainty. The water washing step is carried out on the catalyst at a stage in which there are no appreciable water solubles present. The washing produces no noticeable change in catalyst composition.

After the washing treatment, the catalyst is essentially ready for use in the conversion process. For convenience, it can be separated from the wash water and dried to any degree desired, by any conventional means, and at any convenient temperature including calcination temperature. Preferably, the wash water is removed by slow drying so as not to damage the tablet.

The improved catalysts of the present invention are utilized advantageously in oxidative dehydrogenation processes described in the aforementioned U.S. application. In general, dehydrogenatable feeds such as alkenes, cycloalkenes, alkylpyridines, and alkylaromatics are contacted with the improved catalyst at 700–1300° F., at 0.05–250 p.s.i.a., at an oxygen to dehydrogenatable feed volume ratio of 0.1:1 to about 3:1, and at a dehydrogenatable feed hourly space velocity of 50–5000 v./v./hr. Steam is also present at a steam to dehydrogenatable feed ratio of 2:1 to 300:1, preferably 15:1 to 30:1.

The advantages of this invention are further illustrated by the following examples. The reactants and the proportions and other specific conditions are presented as being typical and should not be construed to limit the invention unduly.

EXAMPLE I

A catalyst was prepared by a procedure such as the following:

(A) 17.22 pounds of $SnCl_4 \cdot 5H_2O$ were dissolved in four gallons of deionized water plus 100 milliliters of concentrated hydrochloric acid.

(B) 3.72 pounds of 85 percent phosphoric acid were added to two gallons of deionized water.

(C) One pound of ammonium sulfate and seven liters of 58 percent ammonium hydroxide were dissolved in fifteen gallons of deionized water.

The temperature of A, B and C was adjusted to 70° F. or below.

A reactor was charged with 0.5 pound of ammonium sulfate dissolved in five gallons of deionized water. The reaction mixture was then adjusted to maintain the pH at about 3.5 and the temperature maintained below 90° F.

A and B were admixed and then fed to the reactor at approximately four and two gallons per hour, respectively.

C was fed to the reactor at approximately fifteen gallons per hour to maintain the pH at about 3.5.

The reaction mixture was stirred for one hour after precipitation and then filtered. The precipitate was then washed with an ammonium sulfate solution containing one pound of ammonium sulfate in ten gallons of deionized water. This step was repeated four times. The precipitate was then spray-dried, calcined, and tableted.

Lubricant was removed by passing air over the tablets and heating from thirty minutes to two hours at temperatures ranging from 500° F. to 1100° F. in a manner which removed all carbon from the catalyst before the catalyst temperature reached 900° F.

Tablets having a pore volume of about 0.35 milliliter per gram were impregnated with lithium nitrate solution, dried, and calcined.

The contents of the finished catalyst, based on the total weight of the catalyst, were approximately as follows: 1.5% Li, 10.0% P, 58.4% Sn.

The above prepared catalyst was treated with running hot tap water for about 5 minutes and drained. This treatment was repeated once, then the catalyst was dried. The catalyst was then used in an oxidative dehydrogenation reaction wherein butenes were converted to butadiene at 900° F., at a butenes gas hourly space velocity of 300 v./v./hr., at an 18:1 steam to olefin ratio, at a 0.8:1 oxygen to olefin ratio, and at essentially atmospheric pressure. For purpose of comparison, an untreated portion of the catalyst was also tested in an essentially identical manner. The result of these tests are shown in the Table I below. Samples were taken at 3 hours into the run at which time the activity was considered to be at a steady state.

TABLE I

| | Untreated catalyst | Hot water treated catalyst |
|---|---|---|
| Butadiene yield, percent [1] | 25 | 36 |
| Butadiene modivity, percent [2] | 85 | 91 |
| Cl in catalyst, wt. percent | 0.02 | 0.02 |
| Surface area of catalyst, $m.^2/g$ | 22 | 24 |
| Pore volume of catalyst, cc./g | 0.30 | 0.35 |

[1] Percentage of feed converted to butadiene in a single pass.
[2] A modified selectivity to butadiene; selectivity based on analysis of gas phase products only, neglecting any solid and liquid phase products for convenience; it is a close approximation of selectivity.

The data above show that the washing treatment very significantly improves the dehydrogenation process. This is of substantial importance in that it can improve the performance of the portion of the catalyst bed at the inlet of the reactor. The temperatures at the inlet are generally lower than those at the remainder of the bed to accommodate the exothermic heat of reaction. Excessively high temperatures are also objectionable due to the formation of by-products such as acetylenes and oxygenated compounds.

EXAMPLE II

In another series of tests, catalysts prepared according to the procedure of Example I but with varying lithium levels were washed according to the invention and tested for butene dehydrogenation. The effectiveness of the washing treatment at three different points in the catalyst preparation sequence is illustrated.

All of the catalysts were tested for butene oxidative dehydrogenation at atmospheric pressure, at a temperature of 1000° F., a butene space velocity of 300, an on stream time of three hours, a steam/butene ratio of 18:1, and an oxygen/butene ratio of 0.8:1. The catalyst were tested before washing, and after washing according to the procedure of Example I. Cold tap water was employed as cold water wash and hot tap water was employed as the hot water wash. The catalyst washing was carried out by placing the tablets in a vessel and flushing the tablets with the water in a swirling action allowing the vessel to overflow. The washing lasted 3–5 minutes. Butadiene yield and modivity results are given in Table II.

TABLE II

| Cat. No. | | Conversion to butadiene | | | | | |
|---|---|---|---|---|---|---|---|
| | | Untreated | | Water washed | | | |
| | | | | Cold | | Hot | |
| | | Y | M | Y | M | Y | M |
| | Catalyst base (10% P on SnO₂): | | | | | | |
| 1 | After tableting, but before calcining | (34) | (88) | 44 | 90 | 47 | 89 |
| 2 | After tableting, and after calcining | 34 | 88 | 41 | 90 | 40 | 91 |
| | Catalyst (10%P on Sn₂+Li): | | | | | | |
| 3 | Catalyst 1 impregnated with 1.5% Li | | | | | 60 | 94 |
| 4 | Catalyst 2 impregnated with 1.4% Li | | | | | 56 | 95 |
| 5 | After impregnation with 1.4% Li | 36 | 94 | 55 | 97 | 55 | 97 |
| 6 | After impregnation with 1.5% Li | 43 | 94 | 55 | 95 | 61 | 93 |
| 7 | After impregnation with 3.0% Li | 44 | 94 | 55 | 97 | 58 | 95 |

It is seen from the table above that the catalyst base, even without the incorporation of lithium, is improved by washing. Catalyst base No. 1 and No. 2 further show that the treatment can be carried out either before or after the calcination which follows the tableting operation.

From the results of Catalyst Nos. 3 and 4, it is seen that the advantage gained in water washing the base is still retained even after incorporation of the lithium and with no further washing required.

From the results of Catalyst Nos. 5, 6, and 7, it is seen that the invention treatment can also be applied with advantage to a catalyst which has been impregnated with an alkali or alkaline earth metal and given its final calcination.

EXAMPLE III

To demonstrate that possible small changes in chlorine-content do not affect activity, the following runs were conducted according to Example I. The catalysts contained no lithium and ten percent phosphorus on SnO₂. The results are given in Table III.

TABLE III

| Weight percent Cl retained in precipitate | Temperature, °F. | Butadiene Yield, percent | Modivity, percent |
|---|---|---|---|
| 1.96 | 900 | 38 | 100 |
| | 1,000 | 68 | 100 |
| .63 | 900 | 75 | 99 |
| | 1,000 | 66 | 99 |
| .25 | 900 | 65 | 99 |
| | 1,000 | 85 | 99 |
| .06 | 900 | 87 | 96 |
| | 1,000 | 81 | 97 |

The results demonstrate that yield and selectivity to butadiene are not affected by small changes in chlorine content of the catalyst and that the invention cannot be considered a mere washing out of soluble impurities.

Although this invention has been described in considerable detail, it must be understood that such detail is for the purposes of illustration only and that many variations and modifications can be made by one skilled in the art without departing from the scope and spirit thereof.

I claim:

1. In a process for the production of an activated oxidative dehydrogenation catalyst composition consisting essentially of a calcined mixture of four components as follows: 0.1 to 16 weight percent phosphorus; 15 to 75 weight percent tin; 0.1 to 10 weight percent of a metal selected from the group consisting of Group Ia metals and Group IIa metals, and oxygen; the improvement which comprises, subsequent to forming catalyst particles into a desirable final physical shape, the step of contacting said particles with water at a temperature in the range of 35° to 212° F. for a time in the range of 10 seconds to 60 minutes wherein the composition of said catalyst particles prior to said contacting step includes at least said phosphorus component and said tin component.

2. The process of claim 1 wherein the composition of said catalyst particles prior to said contacting step includes all of said phosphorus, all of said tin, all of said Group Ia or Group IIa metal and all of said oxygen.

3. The process of claim 2 wherein said Group Ia or Group IIa metal component is lithium.

References Cited

UNITED STATES PATENTS

| | | | |
|---|---|---|---|
| 3,303,236 | 2/1967 | Croce et al. | 260—680 E |
| 3,327,012 | 6/1967 | Noddings et al. | 252—437 X |
| 3,346,513 | 10/1967 | Hadley | 260—680 E X |
| 3,380,932 | 4/1968 | Alexander et al. | 252—437 |
| 3,396,205 | 8/1968 | Alexander et al. | 252—437 X |
| 3,501,547 | 3/1970 | Nolan et al. | 252—437 X |
| 3,501,548 | 3/1970 | Nolan et al. | 252—437 X |
| 3,513,215 | 5/1970 | Ogle | 260—680 E X |

PATRICK P. GARVIN, Primary Examiner

U.S. Cl. X.R.

252—420